Oct. 24, 1967  W. E. BROWNLEE ET AL  3,348,476
FLAT-FORMED INFLATABLE PRESSURE BAGS
Filed Feb. 4, 1963  3 Sheets-Sheet 1
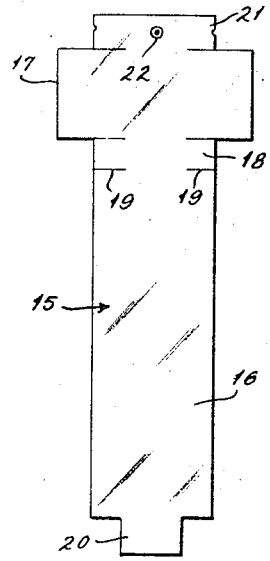
FIG.1
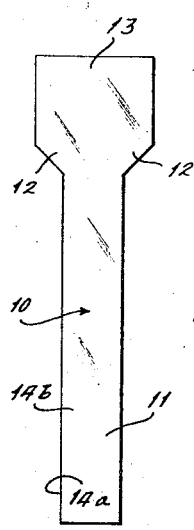
FIG.2
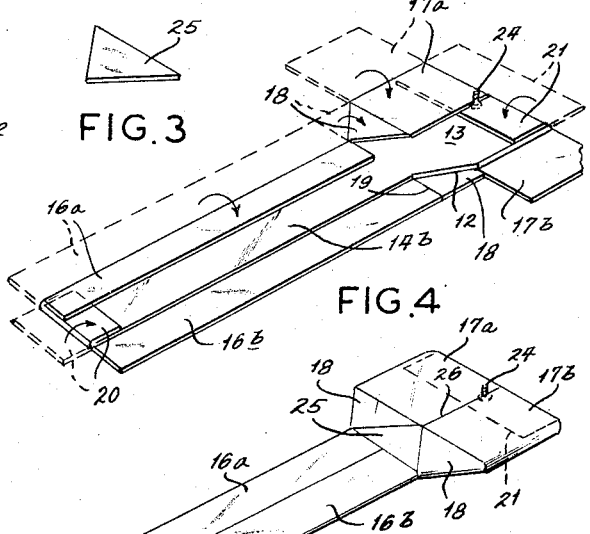
FIG.3
FIG.4
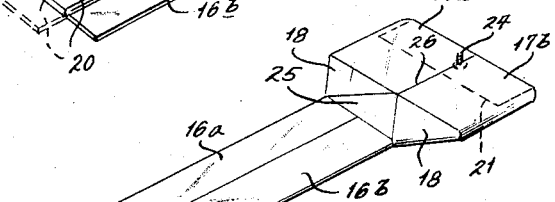
FIG.5
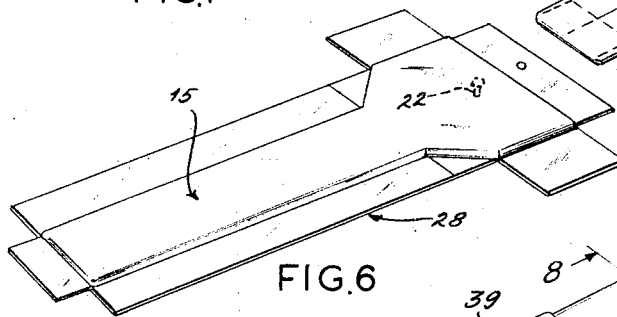
FIG.6
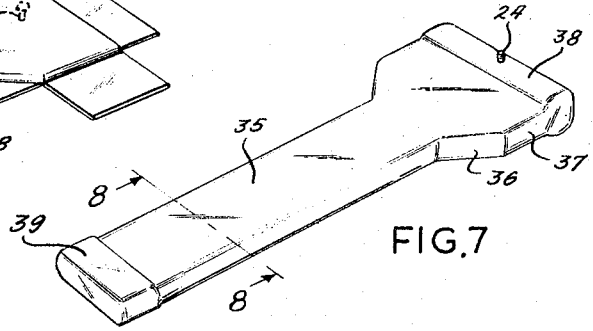
FIG.7
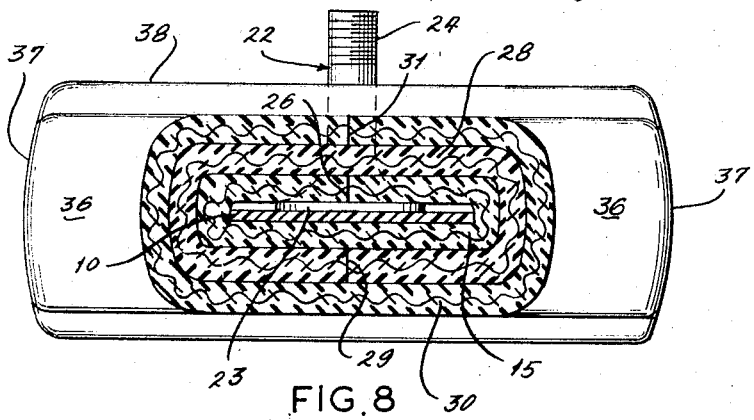
FIG.8
INVENTOR:
WINSTON E. BROWNLEE
BY JACK L. RITCHEY
Jerome A. Grass,
ATTORNEY.

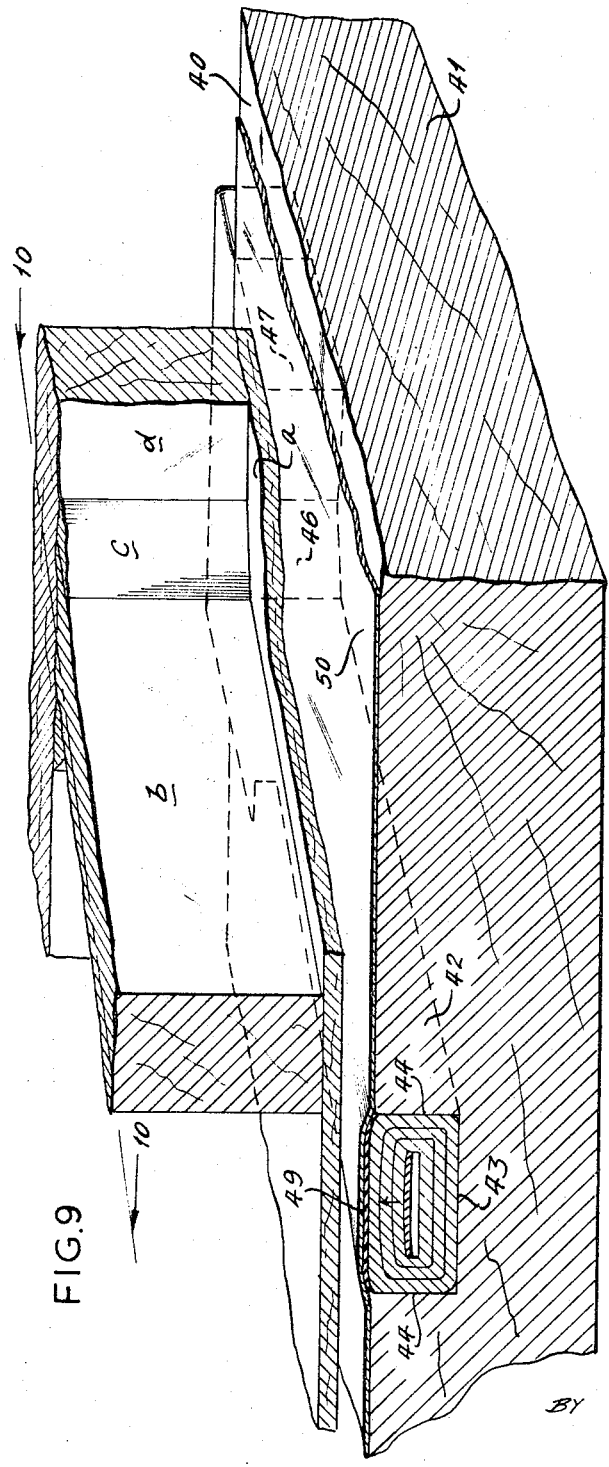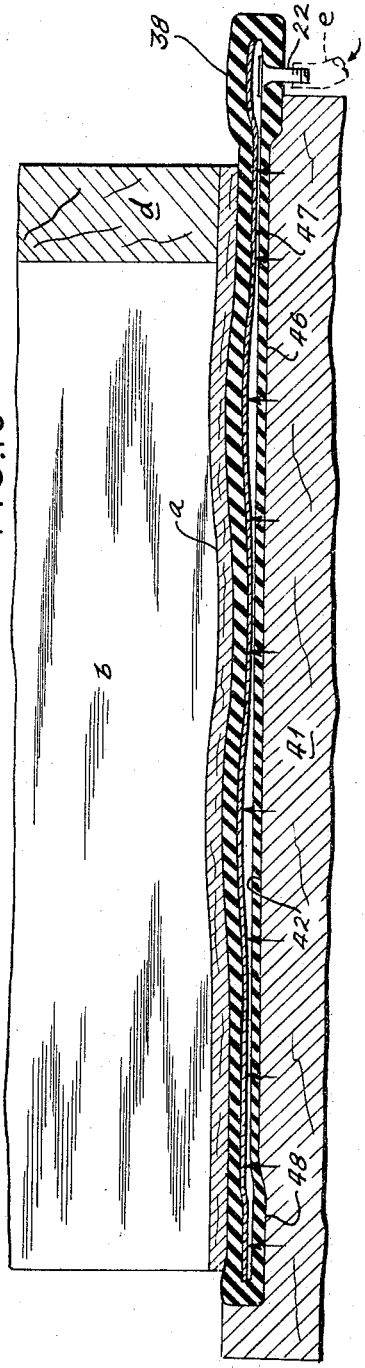

INVENTOR:
WINSTON E. BROWNLEE
JACK L. RITCHEY

BY Jerome A. Gross,
ATTORNEY.

United States Patent Office 3,348,476
Patented Oct. 24, 1967

3,348,476
FLAT-FORMED INFLATABLE PRESSURE BAGS
Winston E. Brownlee, Suttons Bay, and Jack L. Ritchey, Traverse City, Mich., assignors to Parsons Corporation, Detroit, Mich., a corporation of Michigan
Filed Feb. 4, 1963, Ser. No. 255,998
8 Claims. (Cl. 100—211)

This invention relates to the construction of inflatable pressure bags to apply pressures over precisely defined areas, within mold cavities, as for use in adhesive bonding operations.

Simple inflatable reinforced-wall bags, such as fabric-ply rubber hoses have long been used to apply pressure for adhesive bonding. Such hoses are ordinarily available only in standard sizes, of constant diameters; and are not likely to fit precisely to the bond areas of specific products. For example, in bonding hollow airfoils having internal skin supports beneath relatively delicate skins, substantial pressures should be applied to the skin portions outward of the reinforcements but must not be exerted against unsupported skin areas.

The principal purpose of the present invention is to provide pressure bags which can be readily fabricated to meet precise dimensional requirements and fairly complex patterns. A further purpose is to fabricate such pressure bags from strong, laminated reinforced-ply material, so as to retain their precise patterns under substantial inflation pressures. A still further purpose is to provide a method of making such bags without mandrels or other materials which must be removed after the bag is vulcanized, and to achieve better vulcanization. An additional purpose is to provide a contoured mold with precise inflatable areas in which strong yieldable pressure is exerted.

These, and related purposes which will be apparent from the accompanying specification, are achieved by the procedures hereinafter described in detail and in the embodiment illustrated. Summarized generally, the invention consists of providing a flat bag made over a flexible flat pattern having one non-adherent surface, against which there is no adhesion on vulcanizing the bag. The pattern remains permanently in place, and between its non-adherent surface and the vulcanized material adjacent to it an inflatable cavity is provided. Conformity to unusual patterns is effected by folding up successive laminae, so tailored as to have butt joints approximately centered with reference to the pattern and alternately opposite each other. The flat-folded form is maintained during the vulcanizing operation, which is performed at sub-atmospheric pressures so as to aid in drawing off liberated gases evenly from both sides of the encased pattern. The bag is thereafter used flatwise; normally it is inflated only enough to take up the maximum of manufacturing tolerances between the workpieces to be joined. To position the inflatable bag precisely, it may be fitted flatwise within a groove in a contoured mold surface, and the space outward of it within the groove filled to the mold contour with rubber-like fill cured in place.

Rubber hoses whose walls include continuous reinforcements, when subjected to repeated inflation to pressures of say, 150 pounds per square inch, and under the elevated temperatures at which some adhesives are set, may have a short service life. Persons familiar with this fact might conclude that a pressure bag so made, whose wall reinforcements are discontinuous, could not last long in service.

We have discovered however that pressure bags made and used flat as herein described, have a highly satisfactory service life, usually exceeding the life of the reinforced-wall hoses by which they are inflated. The reason for this unexpected result appears to be that the tension stresses in their walls vary as a function of the depth to which they are inflated. Wall tension stresses are kept low as long as the bags are held relatively flat.

In the present invention, a bag, inflated only to take up tolerances of the workpieces, may be inflated to a depth of only $\frac{1}{20}$ or less of its width, both depth and width being measured inside the cavity as inflated. Wall stresses which result are far lower than would be experienced in similarly pressured round hoses of the same width.

Such a pressure bag is combined with a mold, in one embodiment of the invention illustrated herein. The contoured wall of the mold is provided with a flat groove or recess, patterned correspondingly to the outer dimensions of the bag when deflated. Thus at all points along its length the groove is of such width as to correspond to the bag width when flattened and of such depth as to present the outer bag surface closely adjacent to (but not beyond) the contoured mold wall. A rubber-like fill over the deflated bag extends smoothly to the contour of the mold wall, so that the contour is smooth and continuous. The mold so made thus includes the bag within it. The novel mold is thus patterned to apply inflation pressure only where workpieces are to be joined within the mold; it is inflatable to a depth adequate to take up tolerances between the workpieces to be joined.

In the accompanying drawings:

FIGURE 1 shows the flat pattern of a laminate of uncured vulcanizable ply material, to be utilized as the first or innermost laminate of a pressure bag.

FIGURE 2 shows the internal pattern of the pressure bag to be constructed, said pattern being formed of flexible film material having one non-adherent surface and one adherable surface.

FIGURE 3 shows an insert or gusset of the same vulcanizable ply material as the laminate of FIGURE 1.

FIGURE 4 shows the pattern of FIGURE 2 with its adherable surface applied onto the vulcanizable laminate shown in FIGURE 1, with the FIGURE 1 laminate partially overfolded, as a step toward forming the innermost layer of a pressure bag.

FIGURE 5 shows the completion of the folding and positioning operations of FIGURE 4, including the insertion of the insert or gusset of FIGURE 3 therein.

FIGURE 6 shows the positioning of the bag of FIGURE 5 on a second vulcanizable ply laminate, prior to folding.

FIGURE 7 shows the folded-up bag, after applying three laminates.

FIGURE 8 is a cross section taken along line 8—8 of FIGURE 7.

FIGURE 9 is a perspective sketch showing a part of a lower member in which the bag of FIGURE 7 is incorporated, in relation to workpieces which are to be adhesively bonded in the positions shown.

FIGURE 10 is a cross-sectional view taken along line 10—10 of FIGURE 9.

Figure 11:
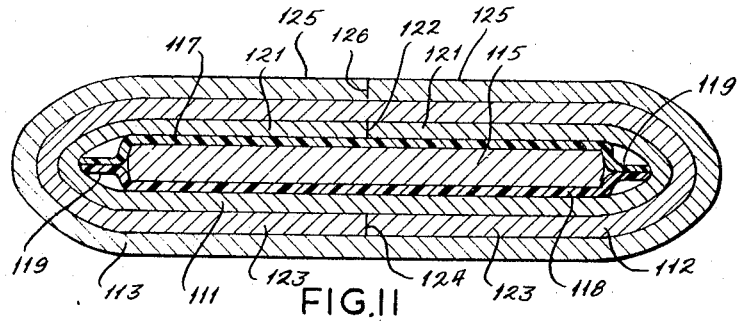
FIGURE 11 is a sketch of a typical cross section through a modified pressure bag construction in which the bag includes an internal metal pressure area pattern.

The pressure bag shown is a relatively simple one, but illustrative of the potentialities of the present invention. Uncured vulcanizable ply material is cut to appropriate flat pattern shown in FIGURE 1, for forming the first or innermost laminate of the pressure bag. Such material is basically a fabric, preferably woven of glass fiber, heavily impregnated, permeated and coated on both sides with an uncured vulcanizable rubber-like compound such as a silicone rubber. The term "vulcanizable" as used herein means curing of a rubber-like material by any procedure appropriate for the particular material, with or without added heat. The glass fiber fabric is utilized for its reinforcement or "ply" strength in tension, which renders the completed article distensible under internal pressure. The term "distensible," as when inflated by internal pressure, is used herein to mean the providing of increased area by tending towards roundness, without any substantial increase in perimeter.

The material for the pattern shown in FIGURE 2 is preferably a thin plastic film, such as Teflon or other material characterized by having a surface which is non-adherent to the rubber-like material adjacent to it even under elevated temperatures and pressures. The opposite surface is etched to render it adherable or adherent. Such pattern material is flexible. As will be seen, edge flexibility of the pattern material is utilized to permit rounding of the edges of the flat-folded bag, which accompanies its inflation to the relatively shallow depth necessary to take up tolerances between the workpieces.

Referring now to the parts illustrated by reference numerals, we first cut an internal pattern 10 of Teflon film, or of other non-adherent flat material having at least one non-adherent surface and flexible edges. The internal pattern 10 establishes the internal dimensions of the pressure bag when deflated. The bag to be formed on the pattern 10 will thus have a long parallel-edged portion 11 such as is suitable for applying pressure to a plywood skin *a* outwardly adjacent to the edge of a rib *b*; also, tapering shoulder portions 12, suitable for applying pressure over triangular glue blocks *c*; also a broadened rectangular portion 13, such as would apply pressure to a broad area of an edge reinforcement *d*. Such workpieces *a*, *b*, *c*, and *d* are shown schematically in FIGURES 9 and 10.

The pattern 10 has an undersurface 14a etched or otherwise processed to render it adherent or adherable to the rubber-like material; whereas the upper surface 14b is not so treated and therefore retains its non-adherency.

The first bag ply laminate, generally designated 15 in FIGURE 1, is cut from the glass fiber cloth material impregnated and coated with uncured vulcanizable rubber. It includes a rectangular portion 16 twice the width of the rectangular portion 11 of the internal pattern 10; an enlarged rectangular portion 17 adjacent its upper end, twice the width of the rectangular portion 13; an intermediate portion 18 slit inwardly on both sides by slots 19 to provide for folding in the manner shown in FIGURE 4; a lower end tab 20 of approximately half the width of the rectangular portion 16; and an upper end tab 21 approximately half the width of the enlarged rectangular portion 17. The tabs 20, 21 project at the mid-portions of the respective pattern ends, as shown in FIGURE 1. The pattern 10 is applied with its adherable surface 14a downward upon the tacky uncured surface of the first laminate 15 and centered within the laminate's width, so that its non-adherent surface 14b faces upward. Marginal edge portions 16a, 16b of the rectangular portion 16 are left projecting as shown in FIGURE 4, likewise marginal edge portions 17a, 17b of the enlarged rectangular portion 17; also the end tabs 20, 21.

The tab 21 is punctured and a hollow metal tubular connector 22, which may be a hollow rivet, having a flared inner end 23 and a threaded stem portion 24, is inserted through it. The tabs 20, 21 and such marginal edge portions 16a, 16b, 17a, 17b are then folded over the non-adherent surface portion 14b. The flared head 23 of the hollow rivet 22 is thus presented against the undersurface 14a of the pattern 10 as shown in FIGURE 8. Taking advantage of the slits 19, parts of the intermediate portion 18 are overfolded on the diagonal, as shown in FIGURE 4. By such folding, precisely along the edges of the pattern 10, butt joints are established between the edges of the marginal portions 16a, 16b and the marginal portions 17a, 17b, along the center line of the first laminate 15. Lateral butt joints are formed where the intermediate portion 18 is folded on the diagonal to meet the lateral edges of the marginal portions 17a, 17b. A triangular insert or gusset 25, of the same material as the first laminate 15, is set in, this gusset being tailored to a butt joint fit, as shown in FIGURE 5. While, for flatness, the tabs 20, 21 might have instead been butt-jointed into marginal portions 16a, 16b by cutting the mating edges 16a, 16b, 17a, 17b on the diagonal; this is not necessary, as increased thickness at the bag ends may be provided for by recessing ends of the grooves in the mold hereafter described.

The tacky vulcanizable material on both sides of each joint is thoroughly worked into adherency by kneading, as with a hand tool, so that its vulcanizable material is made substantially continuous across the joints; and the fibers of the fabric at the joint edges are positioned in intimately close relationship. On subsequent vulcanization, the vulcanizable material at the joints will thus be unified. Even though the glass fiber fabric is not truly continuous, vulcanization of the rubber-like material permits load transfer in shear to adjacent plies. This is sufficient to carry tensile loads across the joints, without substantial stretching.

After the first laminate 15 has been folded in the manner shown in FIGURE 5 and its edges so worked together into joints with each other and with the edges of the insert 25, it is then turned over, and its lengthwise butt joints (as between its marginal portions 16a, 16b, 17a, 17b) are centered upon a second laminate 28 of the same material. The second laminate 28 is cut to substantially the same pattern as the first laminate 15, being just sufficiently larger as to overwrap the first laminate 15 and provide similar butt-joined edges. Likewise a similar triangular insert is cut and fitted, as with the first laminate 15. The only difference in procedure in applying the second laminate 28 is puncturing it so that the hollow rivet 22 may extend through it. When folded, its mating edges are kneaded or worked in similar fashion, providing joints including a similar lengthwise butt joint 29 centered on the side opposite the lengthwise butt joint 26 of the first laminate 15.

The assembly is again turned over and the butt joint 29 of the second laminate 28 is centered upon a similarly-cut third laminate 30, which is then overfolded in similar fashion to provide a lengthwise butt joint 31 centered and in registration with the butt joint 26 of the first laminate 15 and opposite the butt joint 29 of the second laminate 28. The positioning of these laminates is shown in detail in FIGURE 8, a cross section taken along line 8—8 of the three-ply bag shown in FIGURE 7. Should additional laminates be desired, they would be folded with edges meeting on alternate sides of the bag, until the desired number of layers was provided.

As will be apparent, the overfolding of the marginal portions 16a, 16b, 17a, 17b, relative to the tabs 20, 21, provides strongly reinforced ends, closing the bag so that there is only one inlet; that is, the hollow rivet 22.

The bag shown in FIGURE 7 is then vulcanized by procedures appropriate for the particular rubber-like material of which the laminates 15, 28, 30 are composed. Such vulcanization will normally be at elevated temperatures. Gases are liberated on such vulcanization, and bubbles of gas must not be entrapped within it. To avoid this and to achieve thorough vulcanization in the minimum time, we provide the new step of vulcanizing the article of FIGURE 7 with the vulcanizable material of the laminates 15, 28, 30 folded and pressed flat against the pattern 10, at pressure less than atmospheric. The entire article of FIGURE 7 is placed in a partial vacuum and so maintained during vulcanization, and sub-atmospheric pressure is also applied to the inside by the flattened article by a vacuum hose attached to the rivet 22. By vulcanizing flat at a pressure less than atmospheric pressure, the gases liberated on vulcanization are drawn off evenly from both sides of the bag, as they form; bubbles which might effect the strength of the finished article are avoided, and the vulcanization is completed much more rapidly and thoroughly than if an internal mandrel was used and vulcanization proceeded at atmospheric pressure. This process gives acceptable strength to the butt joints of the vulcanized rubber, even though the fabric of each ply is discontinuous at the joints.

The resultant article is a distensible pressure bag in which an inflatable cavity is produced, between the non-adherent surface 14b of the pattern 10 and the adjacent first laminate 15, by the vulcanization of the laminates. The completed article, shown in FIGURE 7 and detailed in FIGURES 8, 9, and 10, is a distensible body having three reinforced ply laminates which are joined alternately at opposite sides of the bag, by the butt joints 26, 29, 31. Since the joints are alternately opposite each other, they are reinforced by the adjacent bag layers, unified by vulcanizing. The pattern of the pressure bag so formed is provided by the inner pattern 10, whose size equals the inner size of the bag when flattened. The hollow body which makes up the bag has closed ends, but the air inlet provided by the hollow rivet 22 provides for inflation. Since the bag is intended to exert pressure flatwise, between a mold surface and a workpiece surface which is nearly parallel to the mold surface, such inflation merely rounds the flat folded edges of the pattern 10 and the laminates 15, 28, 30.

The shape of the pressure bag illustrated in FIGURES 7, 8, 9, and 10 is much more complex than the usual round reinforced-wall hose utilized for applying pressure. The portion of constant cross section (as taken along line 8—8 of FIGURE 7), extends for a substantial part of its length and designated its principal lengthwise portion 35. It also has tapering portions 36 to apply pressure over the glue blocks c, and a widened end pressure-applying portion 37, adjacent to which it terminates in a thickened portion 38 which results from overfolding the tabs 21 of the laminates 15, 28, and 30 as described. A similarly enlarged portion 39 results at the inner end from folding of the tabs 20 into such lap joints.

The complex shape may be readily varied, as will be obvious, so that it meets the pattern and precise dimensional requirements of areas over which pressure is to be applied. The actual width of a bag such as shown in FIGURE 7 is greater than its surface portion which applies pressure, as will be apparent from FIGURE 9; the rounded bag edges themselves cannot press flatwise against the workpieces.

While air bags formed in the manner illustrated and having characteristics herein described are utilized in various ways, a highly advantageous utilization is by recessing such a bag within the contoured surface of a mold as illustrated in FIGURES 9 and 10.

Assume the typical problem of applying bonding pressures to workpieces consisting of a plywood skin a and a plurality of spaced ribs, one of which is shown as the rib b secured by triangular glue blocks c to an edge reinforcement strip d. The plywood skin a may be pressed to any flat or curved contour presented by the edge of the rib b. Pressure against the skin a is supplied by the inner contoured surface 40, of a mold wall generally designated 41, typically formed of hard wood. In FIGURES 9 and 10 the contour of the mold wall 41 is shown as flat, for clarity of illustration; but in the typical case, such contoured wall 40 might be a gentle concave curve, as would form the convex curve of the outer surface of an airfoil. Its pressure is to be resisted through the workpiece by an opposite mold wall, not illustrated, which may be similar or of some other construction.

To accommodate the bag of FIGURE 7, a groove or recess generally designated 42, having a flat bottom 43 and substantially perpendicular walls 44, is provided in the mold wall 41. The width of the groove between its walls 44 corresponds to the outer width of the bag shown in FIGURE 7 when deflated. As shown in FIGURE 9 it corresponds to the outer width of the flattened lengthwise portion 35; whereas at its far end the groove is enlarged to provide a tapering portion 46, and a widened portion 47 which extends to the outer edge of the mold, where the thickened bag end 38 projects. There the hollow rivet 22 is provided with an air pressure hose e as shown in dotted lines. The groove 42 has a deepened portion 48 shown at the left end of FIGURE 10, to accommodate the extra thickness of the enlarged bag portion 39.

The depth of the groove 42 is generally greater than the thickness of the bag, so as to present the outer surface of the bag (that is, the surface which is not adjacent to the bottom 43 of the groove 42) close to but not beyond the contoured mold wall 40. A rubber-like fill 49, preferably of room temperature curing rubber, is smoothly filled in above the bag and to the contour of the mold wall 41, so that this surface will present a continuous contour when the bag is deflated. Preferably the entire mold surface 40, including the surface of the fill 49, is smoothly lined with material such as the Teflon sheet 50, which has a non-adherent molding surface.

On inflation as shown in FIGURES 9 and 10, the bag distends, pressing the skin a upwardly against the edge of the rib b until their precise fit prevents further distension. For purposes of illustration, the lower end of the ribs b shown in FIGURE 10 does not closely follow the contour of the mold wall 41, but is somewhat undulated, as illustrated in exaggerated form. Regardless of such undulations, the inflation pressure (shown by the vertical arrows of FIGURE 10) is applied evenly along the edge of the rib b and provides secure attachment. No pressure is exerted on portions of the skin a in the spaces between the ribs b.

Adhesive joining is frequently carried on at elevated temperatures. Especially when such temperatures are elevated, rubber tends to fail under repeated application of inflation pressure to say 150 p.s.i. Persons familiar with problems of the art would expect bags formed in the manner described to split open, because of the discontinuity of the fabric at the joints.

We have found that a bag formed in the manner herein described tends to last longer, under repeated inflations and at elevated temperatures, than the round reinforced-wall rubber hoses used to inflate it. The reason for this unexpected long life appears to be that the present bags are inflated to only that depth sufficient to take up tolerances in the workpieces within the mold. In only an extreme case would such inflation be as much as .10"; normally no greater inflation than .025" would be necessary. Considering the width of a typical bag such as is used for applying pressure to an airfoil skin outside of its ribs, the amount of such inflation may be only 1/20 or less of the width. As may be demonstrated mathematically, the resultant wall stresses in tension are far less than would be experienced were air hoses utilized in substantially round form. Thus, even though the glass fiber cloth in the individual plies is discontinuous across the joints, bags made as herein described will have a highly satisfactory service life.

Where it is not feasible to locate the pressure bag in the groove of a mold wall or by other precise means, the bag may be formed about a metal pressure area pattern, as in FIGURES 11, 12, 13, 14. An inner laminate 111, intermediate laminate 112, and outer laminate 113 are cut to suitable plan form. They are of glass fiber fabric or other ply reinforcement material, impregnated and coated with uncured rubber or other vulcanizable material in tacky form. Independently a pressure area pattern 115 is cut from aluminum sheet material or other sheet material, preferably metal, characterized by substantial rigidity in the plane of the sheet, so as to resist edgewise-applied forces. The pressure area pattern 115 establishes with substantial precision the area over which pressure will be applied by the bag service against a resisting workpiece when inflation distends the bag edges to roundness.

An interior bag pattern, corresponding to the entire area between the edges of the inner laminate 111 as defined by folding, consists of the pressure area pattern 115 together with larger non-adhesive film patterns, namely an upper bag pattern film 117 and a lower bag pattern film 118 formed of material having a non-adherent outer surface, such as Teflon. The inner surface (that is, adjacent to the presure area pattern 115) is made adherent by etching with acid or other suitable means, and is adhered to the upper and lower surface of the pressure area pattern 115 so as to envelope sealingly or encapsulate it and leave marginal portions 119 adhered together, as shown in FIGURE 11, projecting flexibly around the entire pressure area pattern 115. The marginal portions 119 thus extend into the edge folds of the inner laminate 111 as will now be described.

The pressure area pattern 115, so sealedly enveloped within the upper and lower bag pattern films 117, 118, is centered on the tacky uncured rubber-like surface of the inner laminate 111; and 180° edge folds 121 of its edges are made precisely along the outer edges of the margins 119 of the bag pattern films 117, 118, flatly on top of the pressure area pattern 115. The edges of the inner laminate 111 are thus brought together in a butt joint 122 centered over the pressure area pattern 115. The tacky material at the butt joint 122 is then worked together so that the ends of the fibers of its fabric reinforcing material are intimately positioned, even though not connected to each other.

The intermediate laminate 112 is then laid out flat, the parts theretofore assembled are centered upon it with the butt joint 122 facing down, and edge folds 123 are made precisely against the edge folds 121, placing the tacky material of the intermediate laminate 112 in intimate contact with that of the inner laminate 11. The fibers and rubber-like material at the edges of the intermediate laminate 112 are worked together into a similar butt joint 124 opposite to the butt joint 122.

This assembly is then centered on the outer laminate 113 with the butt joint 124 facing downward; bag edge folds 125 are made in the outer laminate 113 similarly to bring its tacky material into flat intimate contact with that of the intermediate laminate 112; and the edges of the outer laminate 113 are brought together in a butt joint 126 which may be in registration with the inner laminate butt joint 122 and on the same side of the article.

Where the pattern is not a straight simple one, edges of it are nevertheless similarly formed. Joints in irregular portions are made either by cutting out material or by inserting additional material. Lap joints may often be made, for their extra thickness may in many cases be accommodated by recessing the wall of the mold or fixture in which the inflatable tool is used. Air inlet means are provided suitably for the particular use.

The inflatable tool so formed is then vulcanized in its flat folded form, under such heat and pressure as is necessary to vulcanize the material to cured condition. For this purpose edge-clamping pressure may be applied outwardly of the marginal portions 119 to remove the voids shown in FIGURE 11. The non-adherence of the films 117, 118 will leave an inflatable cavity around the pressure area pattern 115, as shown in FIGURE 12.

Figure 12:
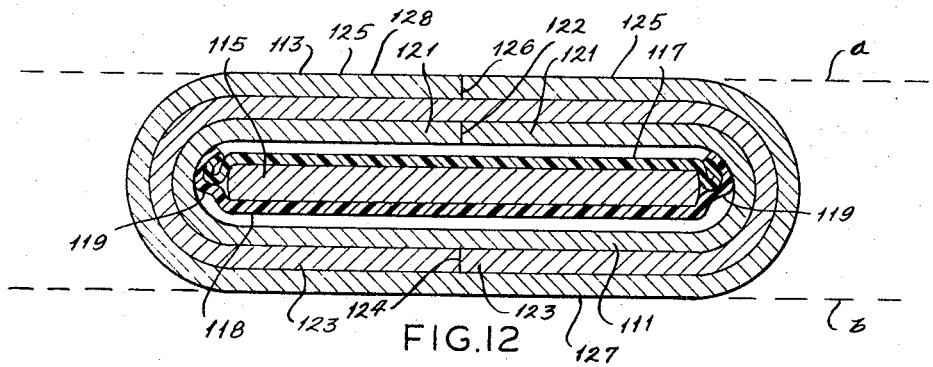
FIGURE 12 illustrates the construction of FIGURE 11, showing the positions of the parts when the bag is inflated.

When the inflatable tool, made in the manner shown in FIGURE 11, is inflated in a fixture or mold, whose wall is shown schematically by the upper dotted line a of FIGURE 12, against a workpiece surface as is indicated by the line b shown schematically in FIGURE 12, the tool will distend, in a manner substantially as shown in FIGURE 12. The edge folds 121, 123, 125 will round, drawing them inward, until limited by the edgewise resistance of the pressure area pattern 115, as the marginal portions 119, having no such resistance, flex upward or downward. The edge resistance of the pressure area pattern 115 thus prevents shifting of the bag out of the pressure pattern defined by the pressure area pattern 115. In this sense, the inflatable tool may be thought of as essentially an inflatable pressure bag having a pressure-applying surface 127 (shown as the lower surface in FIGURE 12) and a pressure-resisting surface 128 shown in FIGURE 12 as pressing upwardly against the bonding fixture wall a. The pressure area pattern 115 may be thought of as resistive means within the bag which makes contact with the folded edges 121 of the inner laminate 111, whenever the tool is sufficiently distended by inflation, thus preventing shifting of the area over which its pressure is applied.

Figure 13:
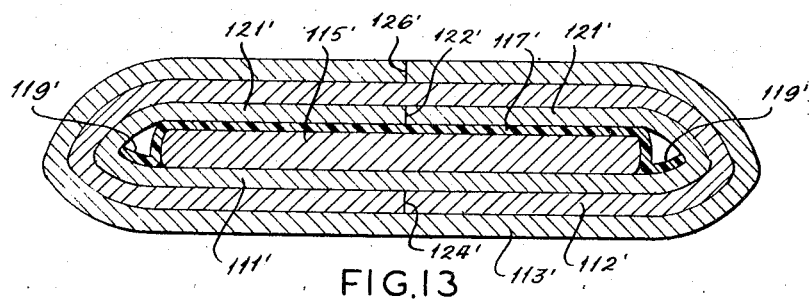
FIGURE 13 is a sketch of a still further modified construction of a bag including an internal metal pressure area pattern.
Figure 14:
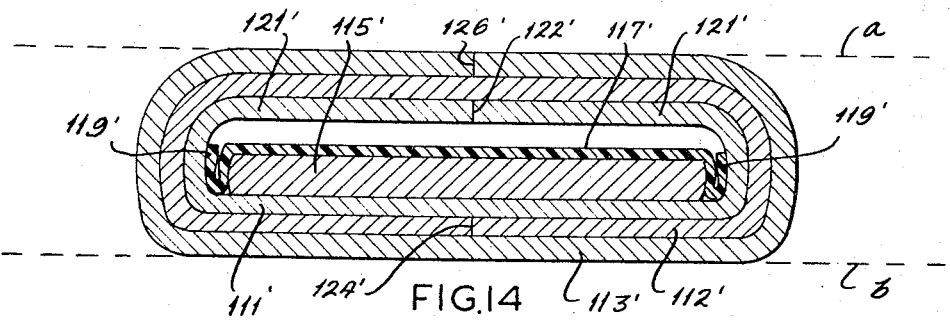
FIGURE 14 illustrates the construction of FIGURE 13 showing the positions of the parts when the bag is inflated.

The modified form of invention schematically shown in FIGURE 13 is produced by a substantially similar method. Inner, intermediate, and outer laminates 111′, 112′, 113′ are similarly cut, as is the pressure area pattern 115′, with its marginal portions 119′ projecting flexibly around all edges of the pressure area pattern 115′. As in the embodiment of FIGURE 11, one surface of the otherwise non-adherent film 117′ is etched or otherwise treated to render it adherable. The marginal portions 119′, as well as the under-surface of the pressure area pattern 115′ itself, are adhered directly to the tacky uncured rubber-like surface of the inner laminate 111′, prior to making its edge folds 121′. The inner laminate 111′ is then completed by making the bag edge folds 121′ and bringing the laminate edges together in a butt joint 122′, the laminate 111′ being folded firmly against the non-adherent outer surface of the bag film 117′ and butt joint 122′ being worked together in the same manner as hereinabove described. The intermediate laminate 112′ and the outer laminate 113′ are applied in the same manner as was described in the embodiment of FIGURE 11, forming butt joints 124′ and 126′ as shown. The bag is then vulcanized and cured, as heretofore described. The inflated view, FIGURE 14, shows the positions of the parts when distension is limited by the space between the workpiece b and the wall a of the adhesive bonding fixture. In this embodiment the inflatable cavity exists only above the film 117′, as shown in FIGURE 14. However the edges of the pressure area pattern 115′ serve as resistive means to prevent shifting in the same manner as described in the prior embodiment.

Further modifications of the present invention will be apparent to those familiar with the art and its problems. Accordingly the present invention is not to be construed narrowly but instead as fully coextensive with the scope of the claims.

As used herein, the term "non-adherent" means characterized by non-adherency to rubber-like material whether uncured or during vulcanization or other curing process.

We claim:
1. The method of fabricating a pressure bag, comprising the steps of
    providing an internal pattern of flexible-edged flat material having at least one non-adherent surface,
    cutting a first laminate of uncured vulcanizable ply material to twice the width of the internal pattern,
    positioning the pattern upon and centered within the width of the first laminate with said non-adherent pattern surface facing upward, so as to leave marginal portions along both edges of the pattern,
    folding both such marginal portions of the laminate along the edges of the pattern and over its nonadherent surface whereby to cause the edges of the laminate to meet thereupon in a joint, thereby providing the innermost layer of the pressure bag, cutting a second similar laminate sufficiently larger than the first to overwrap it, and centering such joint of the first laminate within the width of the second laminate so as to leave marginal portions on both sides of said innermost layer, folding both said marginal portions over said innermost layer and causing the edges of said overfolded marginal portions to meet in a joint on the side opposite the joint of the innermost layer, thereby providing the second layer of the pressure bag, continuing in the same manner to form and overwrap additional laminates with their edges meeting alternately on opposite sides of the pressure bag until the desired number of layers has been provided, closing one end of the layers and providing an air inlet at the opposite end into the innermost layer, and vulcanizing, whereby to provide a distensible pressure bag in which a bag cavity is provided adjacent to the non-adherent surface of the pattern.

2. A method of making a pressure bag as defined in claim 1, the vulcanizable material of each laminate being kneadable, tacky and adherent, prior to vulcanizing, together with the intermediate steps of kneading together the meeting edges of each laminate into an adherent joint prior to applying the next outer laminate, or in the case of the outermost laminate, prior to vulcanizing.

3. The method of making a pressure bag as defined in claim 1, in which the closed end of the bag is formed by the steps of providing each laminate with a tab of half its width projecting at the mid-portion of its end, and folding said tabs back on opposite sides alternately between the layers as they are successively provided.

4. The method of making a pressure bag as defined in claim 1, characterized in that the vulcanizing step is carried out with the vulcanizable material folded flat against the pattern and at a pressure less than atmospheric pressure, whereby to draw off gasses liberated on vulcanizing evenly from the vulcanizable material on both sides of the pattern.

5. A pressure bag for applying bonding pressure and the like, comprising a flat-sided distensible hollow body having a plurality of reinforced ply laminates having joints alternately at opposite side surfaces of the bag and vulcanized to form successive bag layers, and a flexible flat sheet pattern within the innermost layer and of a size corresponding to the inner size of the bag when flattened, said pattern having a non-adherent surface.

6. A pressure bag as defined in claim 5, the surface of the flexible pattern opposite to its non-adherent surface being adhered to the surface of the innermost layer opposite its joint.

7. A pressure bag as defined in claim 5, said hollow body having a closed end and an air inlet extending to the non-adherent surface of said flexible flat sheet pattern, whereby to permit the bag to be formed flat upon the pattern and when inflated distend away from said non-adherent surface.

8. A pressure bag as defined in claim 5, in combination with a rigid mold having a contoured mold wall including a groove patterned to correspond to the outer size of the bag when flattened, the groove being of such depth as to receive the bag and to present its outer surface, when flattened, closely adjacent to but not beyond the contoured mold wall.

References Cited

UNITED STATES PATENTS 2,859,796    11/1958    Taunton    100—211
2,992,955    7/1961    Bowerman    156—213

EARL M. BERGERT, *Primary Examiner.*

DOUGLAS J. DRUMMOND, *Examiner.*